United States Patent [19]
Kosarzecki

[11] Patent Number: 5,546,980
[45] Date of Patent: Aug. 20, 1996

[54] FLOATING CAGE CARTRIDGE VALVE AND KNOB

[76] Inventor: Constantine Kosarzecki, 592 Windsor Cir., Inverness, Ill. 60067

[21] Appl. No.: 382,421

[22] Filed: Feb. 2, 1995

[51] Int. Cl.$^6$ ..................................................... F16K 27/00
[52] U.S. Cl. ..................... 137/454.5; 137/454.6; 137/491
[58] Field of Search ................................. 137/491, 454.5, 137/454.6

[56] References Cited

U.S. PATENT DOCUMENTS

| | | | |
|---|---|---|---|
| 2,882,922 | 4/1959 | Shindel | 137/491 |
| 3,777,777 | 12/1973 | Katchka | 137/454.6 |
| 4,217,927 | 8/1980 | Morita | 137/454.5 X |
| 4,223,693 | 9/1980 | Kosarzecki | 137/106 |
| 4,653,527 | 3/1987 | Kosarzecki | 137/244 |
| 4,679,584 | 7/1987 | Wolff | 137/454.6 X |
| 4,921,547 | 5/1990 | Kosarzecki | 137/115 |
| 4,936,339 | 6/1990 | Bennett | 137/454.6 |

FOREIGN PATENT DOCUMENTS 364671 9/1962 Switzerland ........................... 137/491

Primary Examiner—Stephen M. Hepperle
Attorney, Agent, or Firm—Trexler, Bushnell, Giangiorgi & Blackstone, Ltd.

[57] ABSTRACT

A cartridge valve for installation in a manifold having a receiving cavity which includes an inlet port and an outlet port. The cartridge valve includes a cavity adaptor for engaging the cartridge valve with the receiving cavity in the manifold, a cage assembly which includes a floating cage body within a portion of the cavity adaptor, and a control device which controls the flow through the cartridge valve. The cavity adaptor has walls defining a primary bore and the cage body has walls defining a second bore. The cavity adaptor and the cage body are sized and dimensioned so that an interior dimension of the cavity adaptor is greater than an exterior dimension of the corresponding portion of the cage body. The dimensional difference between the interior surface of the cavity adaptor and the exterior surface of the cage body defines a radial passage. A knob assembly associated with the cartridge valve includes a split collet which is positively retained on a handle portion. A recess in the cartridge valve receives the split collet. A tapered bushing is mated with the split collet to spread portions of the collet to securely engage the collet in the recess in the cartridge valve.

15 Claims, 3 Drawing Sheets

5,546,980

FLOATING CAGE CARTRIDGE VALVE AND KNOB

BACKGROUND

The present invention relates to a cartridge valve for installation in a manifold having a receiving cavity.

Cartridge valves are widely used for proportionately and/or precisely controlling fluid flow or pressure through passages of a hydraulic circuit. In its simplest form, a cartridge valve is used in a receiving cavity of a manifold to regulate the flow of fluid from an inlet port to an outlet port communicating with the receiving cavity. Such cartridge valves are used to controllably operate a fluid circuit and to precisely set and maintain a desired flow through the passage.

Prior art cartridge valves encounter a problem because the design of the valves require precise forming of the receiving cavity in the manifold. If the receiving cavity is not precisely formed in accordance with the required tolerances of the prior art cartridge valve a cage portion of the valve tends to bind or cant against the receiving cavity walls. When the valve binds, a spool portion retained in the cage portion does not freely operate. When the spool does not freely operate, the circuit does not perform as originally designed and additional steps must be taken to determine why the circuit is not operated.

Often times, the cartridge valve is removed and assumed to be defective whereupon a different cartridge valve is installed in the receiving cavity. After a number of attempts with alternate cartridge valves, the mechanic diagnosing the problem may determine that the receiving cavity is the problematic area. The receiving cavity may have to be reworked in order to accommodate the cartridge valve. It should be noted, however, that reworking a receiving cavity may also create problems in that the cavity may become oversized and thereby not providing proper seating and sealing of the cartridge valve installed therein.

Clearly, the problems inherent in prior art cartridge valves require substantial time, effort, and cost. These problems may be escerbated when a valve, which is properly working, fails to operate due to a change in operating conditions. Cartridge valves are used in an environment which is prone to thermal expansion and contraction. Additionally, particulate matter carried in the fluid flow may build up in the valve and foul its operation. With regard to thermal variations, temperature increases may cause the manifold material to expand thereby changing the tolerance of what was previously an acceptable valve. Cooling of the manifold material may provide a similar tolerance variation problem. When the valve tolerances change as a result of thermal expansion or contraction, the valve may bind or leak.

Another problem with prior art cartridge valves occurs as a result of a sampling valve formed in the spool becoming clogged with particulate matter which may be carried in the fluid flow. Since the manifolds are often constructed of metallic materials, particles may be left in the passages and cavities from the original casting and/or machining operations of the manifold. Such particles are carried in the fluid flow once the system is charged. Additionally, particles remaining from the original manufacturing process of the manifold may cause additional wear and thus produce additional particulate matter. When particulate matter is delivered to the spool of a cartridge valve, the sampling orifice may become clogged with such particulate matter. Cleaning of the spool requires extraction of the cartridge valve from the receiving cavity. Removal of the cartridge valve involves depressurizing and draining at least the specific lines associated with the receiving cavity. The removal and cleaning operations require substantial time, effort, cost as well as downtime and the associated downtime costs.

Yet an additional problem found in prior art cartridge valve is that the handle or knob assemblies used to operate and adjust the valves are prone to separation from the cartridge valve. Prior art knob assemblies are attached to the cartridge valve by means of a threaded fastener extending through an adjusting screw portion of the cartridge valve. If the fluid pressure on the adjusting screw is great enough, substantial force may have to be applied through the screw to break open the valve. However, if the force required to brake the valve open is greater than the strength of the material in the screw, or the threaded connection, the fastener may torque off or the threads between the fastener and the adjusting screw may be stripped. Additionally, if the adjusting screw is operated into a maximum limit of the adjusting range, continued application of force to the knob assembly may result in the similar damage. If a knob assembly is damaged, replacement or repair of the knob assembly and associated cartridge valve may require substantial time, effort, cost and associated downtime and cost.

The problems associated with damaged knob assemblies are further escerbated when the failure of the knob assembly causes damage to the control valve. Damage to the control valve may result while boring out a stripped threaded fastener and forming new threads therein. If the adjusting screw is overdrilled during the boring operation, the valve may leak and become irreparably damaged. The additional boring of the adjusting screw also may reduce the strength of the adjusting screw thereby creating a potential fatigue point in the adjusting screw itself. The fatigue point may be the place where the knob assembly fails the next time it is overtorqued.

As it can be seen, there are numerous problems with prior art cartridge valves and knob assemblies. The invention as shown and described herein satisfies the requirements for overcoming the above-described problems.

OBJECTS AND SUMMARY

An object satisfied by the present invention is a cartridge valve which prevents a spool in a cage portion of the valve from binding and thereby providing improved performance.

Another object satisfied by the present invention is a cartridge valve which includes a floating cage which is less susceptible to problems caused by incorrect tolerances in the manifold receiving cavity in which the cartridge valve is installed.

Yet another object satisfied by the present invention is a self-cleaning, non-clogging spool sampling orifice which facilitates greater reliability of operation.

Yet a further object satisfied by the present invention is a knob assembly for use with a cartridge valve which resists damage to the valve as a result of rotating the knob assembly to control the cartridge valve.

Briefly, and in accordance with the foregoing, the present invention envisions a cartridge valve for installation in a manifold having a receiving cavity which includes an inlet port and an outlet port. The cartridge valve includes a cavity adaptor for engaging the cartridge valve with the receiving cavity in the manifold, a cage assembly which includes a floating cage within a portion of the cavity adaptor, and a control device which controls the flow through or pressure the cartridge valve. The cavity adaptor has walls defining a primary bore and the cage body has walls defining a second bore. The cavity adaptor and the cage body are sized and dimensioned so that an interior dimension of the cavity adaptor is greater than an exterior dimension of the corresponding portion of the cage body. The dimensional difference between the interior surface of the cavity adaptor and the exterior surface of the cage body defines a radial passage. A knob assembly associated with the cartridge valve includes a split collet which is positively retained on a handle portion. A recess in the cartridge valve receives the split collet. A tapered bushing is mated with the split collet to spread portions of the collet to securely engage the collet in the recess in the cartridge valve.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

Figure 1:
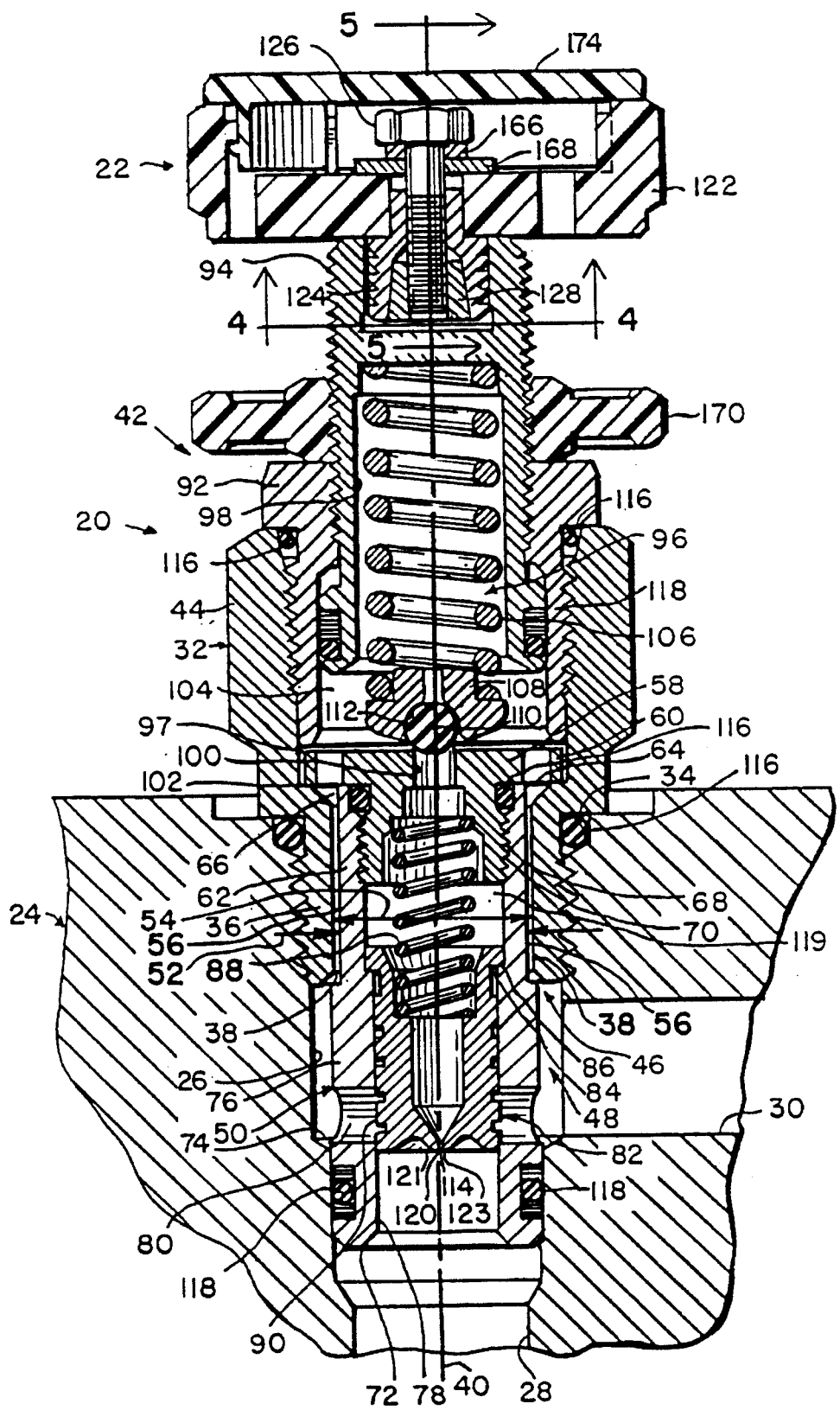
FIG. 1 is a partial fragmentary, cross sectional, side elevational view of a cartridge valve of the present invention engaged in a receiving cavity of a manifold for controlling the flow from an inlet port to an outlet port.

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to FIG. 1, a cartridge valve 20 including a knob assembly 22 is shown. The cartridge valve 20 is engaged with a manifold 24 having a valve receiving cavity 26 formed therein. An inlet port 28 and an outlet port 30 communicate with the valve receiving cavity 26. Fluid flow through the manifold 24 follows a path from the inlet port 28 through the cartridge valve 20 retained in the receiving cavity 26 and into the outlet port 30. The cartridge valve 20 allows precise regulation of the flow or pressure from the inlet port 28 to the outlet port 30.

The cartridge valve 20 includes a cavity adaptor 32 which is threadedly engaged with a mouth 34 of the valve receiving cavity 26. Walls 36 of the cavity adaptor 32 define a primary bore 38 having a central axis 40 longitudinally extending therethrough. A biased adjusting assembly or means for resisting opening of the cartridge valve 42 is retained on a generally extending portion 44 of the cavity adaptor 32 which is positioned outside of the manifold 24. An engaging portion 46 is threaded in the mouth 34 of the cavity 26.

A cage assembly 48 is retained in the primary bore 38 and extends into the valve receiving cavity 26. The cage assembly 48 is tiltable and axially shiftable relative to the central axis 40. Included in the cage assembly 48 is a cage body 50 which has an outside dimension 52 which is less than an inside dimension 54 of the primary bore 38. A radial passage 56 is defined by the difference between the dimensions 52,54. The cage assembly 48 further includes a pilot seat 58 having a radially extending, annular flange 60 and a threaded neck 62. A ledge 64 formed in the primary bore 38 cooperatively retains the radial flange 60 abutting the ledge 64. The configuration of the radial flange 60 and the annular ledge 64 limit the movement of the pilot seat 58 through the primary bore 38 towards the cavity 26.

A first end 66 of the cage body 50 is formed with an internal thread 68 for mating with an external thread 70 on the neck 62 of the pilot seat 58. A second, distal end 72 of the cage body 50 is positioned for engagement with a reduced diameter portion 74 of the cavity 26. The walls 76 of the cage body 50 define a secondary bore 78. A transverse passage 80 is shown in cross section extending through the wall 76 generally perpendicular to the central axis 40. A plurality of transverse passages are spaced around the cage body 50 to allow fluid flow therethrough as described hereinbelow. An axially displaceable spool 82 is retained in the secondary bore 78. The spool has a radially extending, annular flange 84 which abuts an annular ledge 86 formed on an inside surface of the cage body 50. The configuration of the flange and ledge 84,86 limits the movement of the spool towards the second end 72 of the cage body 50. A spring 88 is retained between the pilot seat 58 and the spool 82 to normally bias the spool 82 in a position where the flange 84 engages the ledge 86.

The spring 88 biases the spool 82 in a position whereby an outside surface 90 of the spool blocks the transverse passages 80 preventing fluid flow from the inlet port 28 therethrough. The biased adjusting assembly 42 includes a retaining body 92 threadedly engaged with the cavity adaptor 32, a hollow adjusting screw 94 threadedly engaged with the retaining body 92 and a biased flow or pressure control means 96 retained between a cavity 98 of the adjusting screw 94 and the pilot seat 58.

Movement of the cage 76 and pilot seat 58 in the cavity adaptor 32 is permitted by dimensional differences between the two components 76, 58 and the adapter 32. For example, a gap is formed between the rim 97 of the retaining body 92 and the ledge 64 of the cavity adapter 32. The gap is slightly larger than corresponding thickness dimension of the radially extending annular flange 60 of the pilot seat 58. Additionally, as mentioned hereinabove, the dimensional difference between the cage 76 and the cavity adaptor 32 defines a radial passage 56 therebetween. A small gap is defined between the outside edge of the flange 60 of the pilot seat 58 and the inside surface of the cavity adapter 32 in the area of the ledge 64. These dimensional differences allow a degree of axial movement from a position whereby the flange 60 abuts the ledge 64 to a position whereby the flange 60 abuts the rim 97. Further, a degree of angular displacement relative to the central axis 40 is achieved as a result of canting or displacement of the cage 76 as a result of the passage 56 and the gap between the flange 60 and the inside surface of the cavity adapter 32 and cage assembly 48.

The pilot seat 58 includes an entry aperture 100 and a plurality of flow apertures 102 radially spaced away from the entry aperture 100 generally along the flange 60. A flow chamber 104 is defined between the pilot seat 58, retaining body 92 and adjusting screw 94. Fluid may flow from the entry aperture 100, through the flow chamber 104, into the flow apertures 102 which communicate with the radial passage 56.

The flow or pressure control means 96 includes a spring 106, a ball retainer 108 and a sealing sphere 110. A recess 112 is formed in a face of the ball retainer 108 for captively retaining the sealing sphere 110 therein. The spring 106 biases the retainer and sphere into engagement with the entry aperture 100. As shown in FIG. 1, the adjusting screw 94 is threaded downwardly towards the pilot seat 58 thereby compressing the spring 106 to securely retain the sphere 110 in engagement with the entry aperture 100.

A sampling orifice 114 is formed in the tip of spool 82 and communicates with the inlet port 28 allowing fluid to pass therethrough into the secondary bore 78 and the entry aperture 100. As shown in FIG. 1, the adjustment screw 94 compresses the spring 106 to create a biasing force which is greater than the flow pressure through the sampling orifice 114 against the sphere 110. In this position, the valve 20 is "closed" such that fluid cannot flow from the inlet port 28 through the valve 20 to the outlet port 30.

Before proceeding further, it should be noted that a number of gaskets or seals are provided between the surfaces of the cartridge valve 20 and the manifold 24. For example, nonmovable gaskets 116 are positioned between the retaining body 92 and the cavity adaptor 32, the pilot seat 58 and the cage body 50, and the cavity adaptor 32 and the mouth 34 of the cavity 26. These seals 116 are not moved or otherwise displaced during the normal operation of the cartridge valve 20. Rather, the seal 116 is positioned between the abutting components and the abutting components are assembled thereby compressing the gasket to form a seal. Operable seals 118 are provided between the adjusting screw 94 and the retaining body 92 and the cage body 50 and the corresponding reduced diameter surface 74 of the cavity 26. These sealing points are displaced during the operation of the valve 20 and therefor include an o-ring as well as rigid rings.

Figure 2:
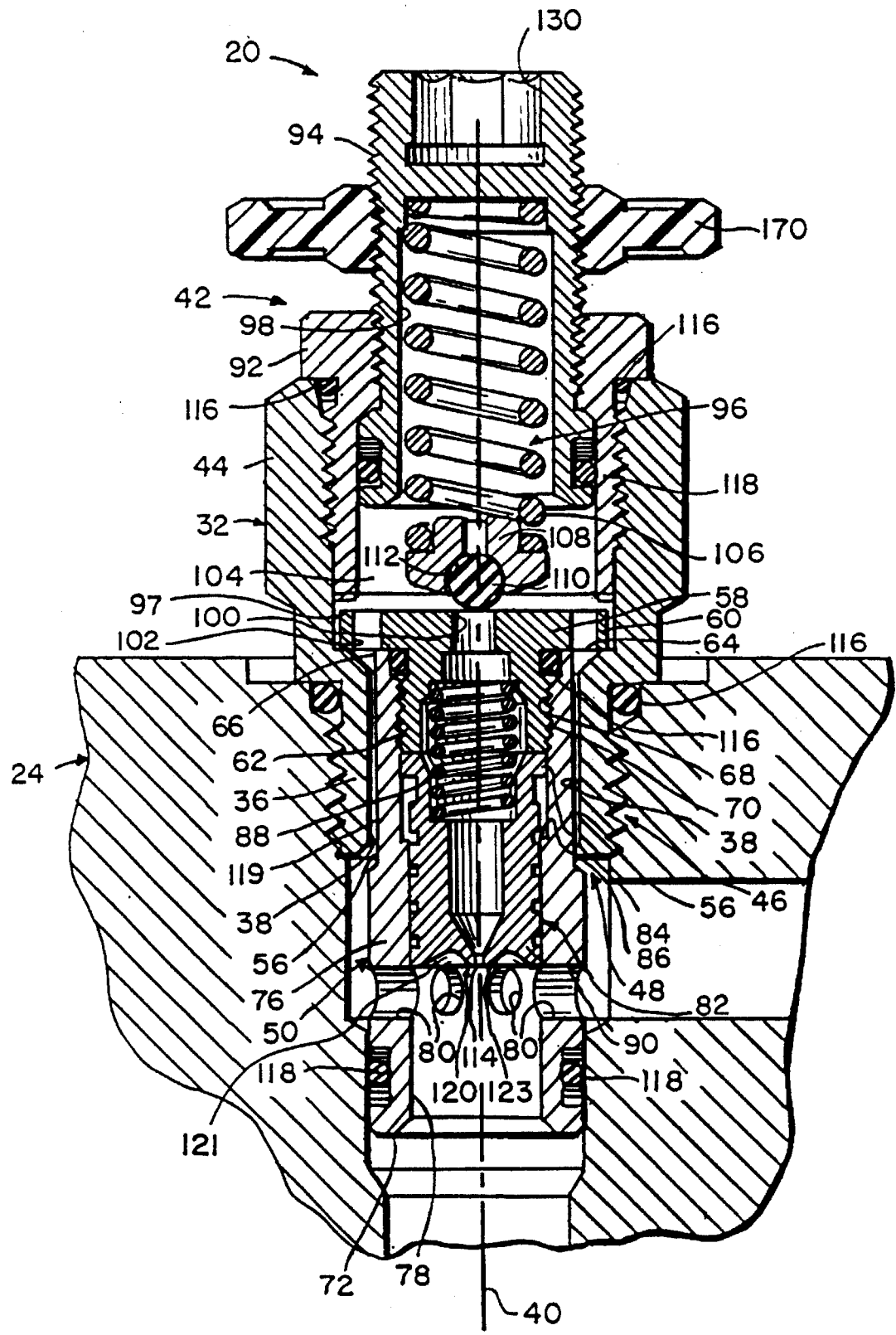
FIG. 2 is a partial fragmentary, cross sectional, side elevational view of the cartridge valve as shown in FIG. 1 in which the valve has been operated to allow flow from an inlet port to axially displace a spool thereby allowing flow from the inlet port through a transverse passage to an outlet port.

Turning now to FIG. 2, the adjusting screw 94 has been axially displaced away from the pilot seat 58 thereby reducing the biasing force of the flow control means 96 on the entry aperture 100. The reduced biasing force allows the sphere 110 to be unseated from the entry aperture 100 by fluid flow through the sampling orifice 114. Fluid flows into the chamber 104 and through the flow apertures 102 to the radial passage 56. Fluid then flows from the radial passage 56 into the outlet port 30. The flow of fluid through the entry aperture 100 reduces the fluid pressure in a chamber 119 defined between the spool 82 and the pilot seat 58. The reduced fluid pressure is less than the fluid pressure on a face 120 of the spool 82 thereby displacing the spool 82 along the central axis 40. The adjusting screw 94 is precisely adjusted to control the biasing force by the flow control means 96. This controlled biasing produces controlled axial displacement of the spool 82 to reveal a portion of the transverse passages 80. The controlled exposure of the transverse passages 80 produces controlled flow from the inlet port 28 to the outlet port 30. As shown in FIG. 2, the adjustment screw has been adjusted to a maximum position away from the pilot seat 58 thereby allowing full exposure of the transverse passages 80 and maximum fluid flow therethrough.

An additional feature of the present invention is the non-clogging face 120 of the spool 76. An annular concave groove 121 is formed in the face 120 surrounding a tip 123 through which the sampling orifice 114 is formed. The annular concave groove 121 collects and directs particles away from the sampling orifice 114 to prevent such particles from clogging the orifice.

Figure 3:
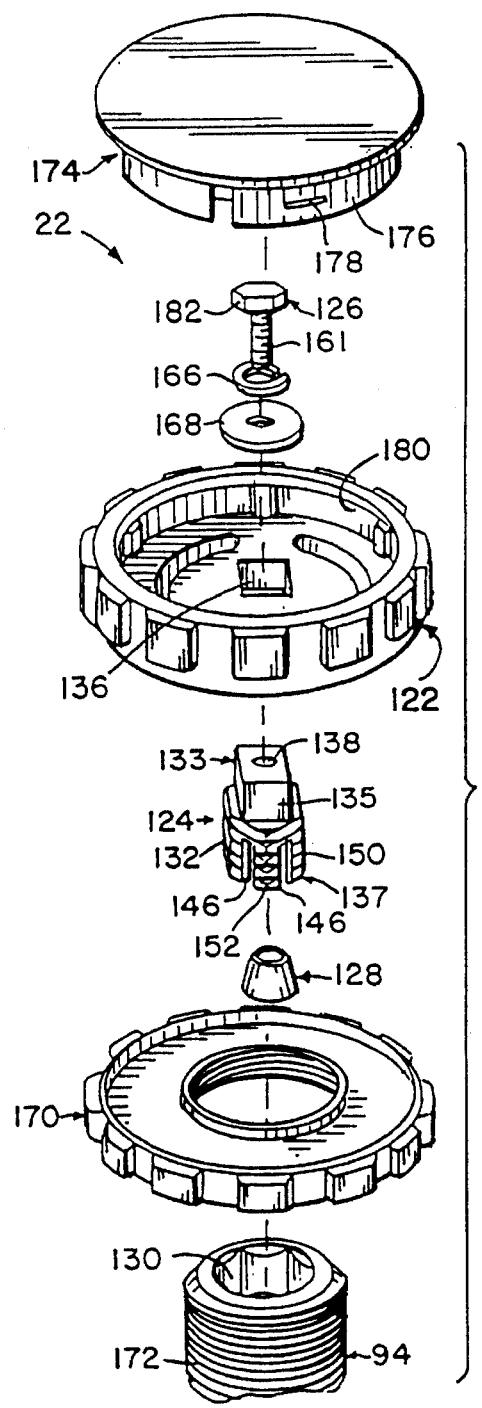
FIG. 3 is an exploded, perspective view of a knob which is engaged with the adjusting screw of the cartridge valve to precisely control the flow or pressure therethrough.

Turning now to the knob assembly 22 as shown in FIGS. 1 and 3–5, the knob assembly 22 includes a handle portion 122, a split collet 124, a fastener 126 and a frustoconical bushing 128 engaged by the fastener 126 and retained in the collet 124. With reference to FIG. 3, the adjusting screw 94 includes a recess 130 formed in an upper portion thereof. A first end 133 of the collet 124 has a keyed external surface 135 which cooperatively engages a corresponding keyed internal surface or aperture 136 formed in the handle 122. An outside surface 132 of a second end 137 of the collet 124 is shaped to cooperatively engage the inside surface of the recess 130. As shown in the preferred embodiment, the shape of the second end 137 of the collet 124 has a hexagonal shape (See, FIG. 4) which corresponds to the hexagonal shape of the recess 130.

The collet 124 is referred to as being split since walls 144 have axially aligned openings 146 formed therethrough. The outside surface 132 of the collet is formed with generally planar surfaces 148 and the axially aligned opening 146 are positioned generally intermediate these planar surfaces 148. The planar surfaces 148 intersect between neighboring axially aligned openings to define an angular protrusion 150. A series of transverse grooves 152 are formed across the angled protrusions 150. A first wall 154 of the groove 152 is formed at an angle 156 relative to a second wall 158. The transverse grooves 152 effectively form barbs 160 on the angled protrusions 150.

Figure 4:
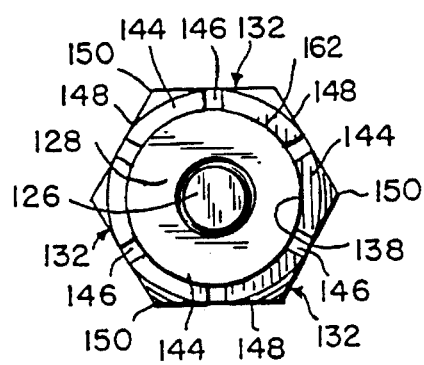
FIG. 4 is a plan view taken along line 4—4 in FIG. 1 showing a bottom portion of a collet and bushing used to retain the knob assembly in a recess on the adjusting screw.
Figure 5:
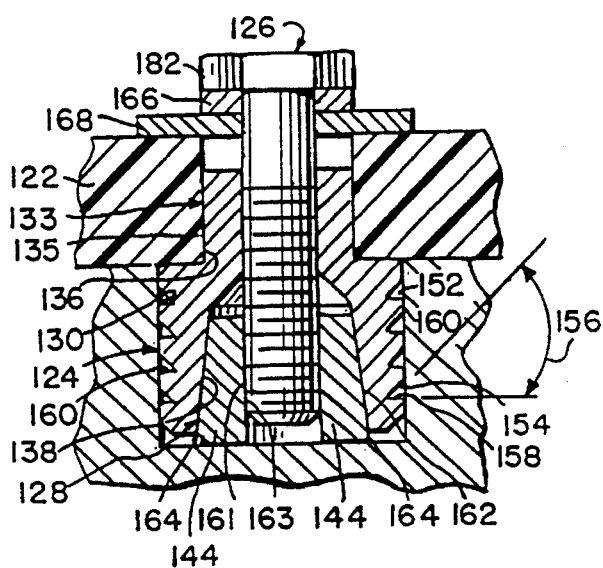
FIG. 5 is a partial fragmentary, cross sectional, side elevational view taken along line 5—5 in FIG. 1 showing the expanding action of the bushing on the split collet as used in the knob assembly of the present invention.

With reference to FIGS. 1, 4 and 5, the frustoconical bushing 128 is employed to drive the angled protrusions 150 of the collet into intimate engagement with a corresponding surfaces of the recess 130. The barbs 160 on the angled protrusions 150 further facilitate secure engagement of the collet 124 in the recess 130.

As shown in the figures, the fastener 126 extends through the keyed aperture 136 of the handle 122 and extends through a bore 138 formed in the collet 124. External threads 161 engage cooperatively formed internal threads 163 formed in the frustoconical bushing 128. Tapered walls 162 of the bushing 128 are urged upwardly through a mouth 164 of the bore 138 by the engagement of the threads 161,163. As the bushing 128 is urged upwardly into the bore 138, the walls 144 of the collet 124 are driven outwardly into engagement with the corresponding walls 139 of the recess 130. A lock washer 166 and an enlarged washer 168 are provided between the fastener 126 and the handle 122 to provide further securing of the fastener 126 once engaged with the bushing 128.

Additionally, a locking ring 170 is threadedly engaged with external threads 172 of the adjusting screw 94 to securely retain a selected adjustment of the adjusting screw 94. A cap 174 includes a rim 176 having spaced apart detents 178 which engage a corresponding internal surface 180 of the handle 122. The cap 174 is secured on the handle 122 to prevent access to the fastener 126 thereby preventing removal of the knob assembly 22 from the cartridge valve 20.

It should be noted that the keyed engagement of the handle 122 with the collet 124 and the expanded friction fit of the collet 124 engaged with the recess 130 prevents damage or failure of the knob assembly 22. Additionally, even if the knob assembly 22 were somehow damaged, replacement is uncomplicated. If, for some reason, the collet 124 were to fail, the fastener 126 is removed thereby relieving the expanding forces produced by the bushing 128 on the collet 124. With the expanding forces removed, the collet and bushing can be removed from the recess 130 whereupon a new knob assembly 22 may be attached. The preferred embodiment of the knob assembly 22 eliminates the risk of stripping a threaded recess on the cartridge valve 20 as in the prior art. There is very little if any risk of the hexagonal portion of the collet 124 stripping or rotating in the recess 130. Additionally, if the fastener cannot be removed from a damaged knob assembly, a head 182 of the fastener is all that needs to be removed. In this situation, once the head 182 is removed, the handle 122 can be removed from the collet and the collet disengaged from the bushing. This is possible since the collet 124 is not threadedly engaged with the fastener 126. The knob assembly of the present invention eliminates damage to the cartridge valve 20 due to failure of the knob assembly 22 as well as potential damage by drilling or tapping a damaged knob assembly 22.

In use, the cartridge valve 20 and the knob assembly 22 of the present invention provide advantages over the prior art. The cartridge valve 20 is inserted and attached to the valve receiving cavity 26 of the manifold 24. The cavity adaptor 32 is threaded to engage the mouth 34 of the receiving cavity 26. The cage body 50 of the cage assembly 48 extends from the cavity adaptor 32 and into the receiving cavity 26. Inlet and outlet ports 28,30 communicate with the receiving cavity 26 and the transverse passages 80 of the cage body 50. The spool 76 is normally biased into a position inside the cage body 50 to block the transverse passages 50. In this position, fluid flow through the inlet port 28 cannot pass through the valve to the outlet port 30.

In the closed position as described above, the adjusting screw 94 is adjusted axially into the retaining body 92 to increase the biasing force of the spring 106 on the ball retainer and sealing sphere 108,110 against the entry aperture 100. This adjustment of the adjustment screw 94 maintains the fluid pressure in the chamber 119 between the pilot seat 58 and the spool 82. Once the adjusting screw is axially adjusted away from the manifold, the biasing force of the spring 106 is reduced thereby allowing fluid flow through the sampling orifice 114 to flow through the entry aperture 100 and into the flow chamber 104.

Fluid entering the flow chamber passes through the flow apertures 102 and the radial passage 56. This initial flow primes the outlet port 30 prior to increased flow through the transverse passages. The adjusting screw 94 can be precisely positioned to provide a desired biasing force which allows controlled movement of the spool 82 in the cage body 50. As the biasing force is reduced, the spool moves axially along the central axis 40 to reveal at least a portion of the transverse passages 80.

An important feature of the present invention is the floating cage assembly 48. The cage assembly 48 is movable or "floats" inside the primary bore 38 of the cavity adaptor 32. A degree of movement of float is permitted between the cage body 50 and the cavity adaptor 32 since the cage body is not threadedly engaged or retained in the cavity adaptor 32. Rather, the cage body 50 is engaged with the pilot seat 58 which is allowed a degree of axial movement between the rim 97 of the retainer body 92 and the ledge 64.

The floating cage assembly 48 feature is very important in that the cartridge valve 20 is very forgiving of inaccurate tolerances in the valve receiving cavity. In this regard, the degree of movement allows the cage body to be angled or canted slightly off the central axis without binding the spool 82 retained therein. In contrast, in prior art devices, if the cage body 50 is canted off of the central axis, the canting tends to bind the spool and prevent movement of the spool within the cage body. Further, the radial passage formed between the outside surface of the cage body and the inside surface of the cavity adaptor allows movement of the cage body in virtually any radial direction.

The knob assembly 22 of the present invention is important to provide precise control and to prevent damage to the cartridge valve 20 as described hereinabove. The knob assembly 22 is easily replaced in the unusual event that the assembly is damaged.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A cartridge valve for installation in a manifold having a receiving cavity formed therein and an inlet port and an outlet port communicating with said valve receiving cavity, said cartridge valve comprising:

a cavity adapter for engagement in said valve receiving cavity, said cavity adapter having walls defining a primary bore and a central axis longitudinally extending therethrough;

means for resisting opening of said cartridge valve operatively associated with said cavity adapter; and a cage assembly operatively associated with said cavity adapter, a cage body of said cage assembly at least partially extending through said primary bore of said cavity adapter, said cage assembly being tiltable and axially shiftable relative to said central axis.

2. A cartridge valve as recited in claim 1, wherein an outside surface of said cage body being sized and dimensioned relative to an inside surface of said primary bore for defining a radial passage therebetween.

3. A cartridge valve as recited in claim 2, said cage assembly further comprising:

said cage body having walls defining a secondary bore, said secondary bore being generally coaxial with said primary bore;

a pilot seat being attached to said cage body at a first end and being operatively retained in said cavity adapter at a second end, said pilot seat having at least one flow aperture formed therein communicating with said radial passage and an entry aperture formed therein communicating with said flow aperture and said inlet port;

a spool operatively retained in said secondary bore in said cage body distal said pilot seat, said spool being axially displaceable through said secondary bore; and biasing means positioned in said secondary bore between said spool and said pilot seat for resisting displacement of said spool through said secondary bore towards said pilot seat.

4. A cartridge valve as recited in claim 3, said cage body further comprising:

said secondary bore communicating with said inlet port, said walls of said cage body having a transverse passage therein communicating with said secondary bore and said outlet port, said spool retained in said secondary bore being biased to block said transverse passage for preventing flow from said secondary bore to said outlet port, whereby said spool being axially displaceable by flow from said inlet port when said valve is opened, said flow from said inlet port displacing said spool to reveal said transverse passage and allowing flow therethrough.

5. A cartridge valve as recited in claim 3, said means for resisting further comprising:

an adjustment screw operatively retained in said cavity adapter, said adjustment screw, said pilot seat and said cavity adapter defining a flow chamber, said flow chamber communicating with said entry aperture and said flow apertures;

said spool having a sampling orifice therein communicating with said inlet port and said entry aperture of said pilot seat; and a biasing plug positioned in said flow chamber for controllably closing said entry aperture operatively associated with said adjustment screw;

whereby said adjustment screw is operated to reduce the biasing force of said biasing plug on said entry aperture to initiate flow from said inlet port through said sampling orifice and through said entry aperture, flow entering said flow chamber being directed through said flow aperture to said radial passage to said outlet port, further operation of the adjustment screw facilitating axial displacement of said spool through said secondary bore to reveal said transverse passage providing controlled flow from said inlet port to said outlet port.

6. A cartridge valve as recited in claim 5, said spool having a face directed towards said inlet port, an annular recess being formed in said face of said spool surrounding said sampling orifice for directing particulate matter in the flow from said inlet port away from said sampling orifice.

7. A cartridge valve as recited in claim 1, said means for resisting opening of said cartridge valve further comprising:

a retainer operatively associated with said cavity adapter, said retainer being cooperatively disposed in said cavity adapter with an lead portion of said retainer being disposed in close proximity to said pilot seat for limiting the range of axial movement of said pilot seat in said cavity adapter;

biased flow control means operatively associated with said retainer for controllably closing said entry aperture against flow therethrough from said inlet port.

8. A cartridge valve as recited in claim 7, said biased flow control means of said cartridge valve further comprising:

an adjustable body being adjustably connected to said retainer for controllably increasing and decreasing the force of said biased flow control means on said pilot seat.

9. A cartridge valve as recited in claim 8, said biased flow control means further comprising:

a spring operatively retained in said adjustable body;

a ball retainer positioned on said spring in close proximity to said entry aperture of said pilot seat, said ball retainer having a face with a recess formed therein; and a sealing sphere positioned in said recess for biased engagement in said entry aperture.

10. A cartridge valve as recited in claim 1, said cartridge valve further comprising a control knob assembly being attached to a recess formed in a portion of said cartridge valve extending from said manifold, said control knob assembly including:

a locking ring retained on said cartridge valve for limiting the movement of said control knob assembly;

a handle for operating said cartridge valve;

a split collet having a first end fixably retained in said handle and a second end extending from said handle said second end having walls defining a mouth and axially aligned openings in said walls, said second end being positioned in said recess formed in said extending portion of said cartridge valve;

a fastener attaching said first end of said split collet to said handle; and a frustoconical bushing retained in said mouth of said second end of said split collet, said bushing being engaged by said fastener and urged inwardly into said mouth for spreading said walls of said second end of said split collet to forcibly engage said recess formed in said extending portion of said cartridge valve.

11. A cartridge valve for installation in a manifold having a receiving cavity formed therein and an inlet port and an outlet port communicating with said valve receiving cavity, said cartridge valve comprising:

a cavity adapter for engagement in said valve receiving cavity, said cavity adapter having walls defining a primary bore and a central axis longitudinally extending therethrough, means for resisting opening of said cartridge valve operatively associated with said cavity adapter; and a cage assembly operatively associated with said cavity adapter, said cage assembly being tiltable and axially displaceable relative to said central axis, a cage body of said cage assembly at least partially extending through said primary bore of said cavity adapter, an outside surface of said cage body being sized and dimensioned relative to an inside surface of said primary bore for defining a radial passage therebetween;

a control knob assembly being attachable to a recess formed in a portion of said cartridge valve extending from said manifold;

a handle of said control knob assembly for operating said cartridge valve;

a split collet of said control knob assembly having a first end fixably retained in said handle and a second end extending from said handle said second end having walls defining a mouth and axially aligned openings in said walls, said second end being positioned in said recess formed in said extending portion of said cartridge valve;

a fastener of said control knob assembly attaching said first end of said split collet to said handle; and a frustoconical bushing of said control knob assembly being retained in said mouth of said second end of said split collet, said bushing being engaged by said fastener and urged inwardly into said mouth for spreading said walls of said second end of said split collet to forcibly engage said recess formed in said extending portion of said cartridge valve.

12. A cartridge valve for installation in a manifold having a receiving cavity formed therein and an inlet port and an outlet port communicating with said valve receiving cavity, said cartridge valve comprising:

a cavity adapter for engagement in said valve receiving cavity, said cavity adapter having walls defining a primary bore and a central axis longitudinally extending therethrough;

a pilot seat being positioned in said cavity adapter, said pilot seat being tiltable and axially shiftable relative to said central axis, said pilot seat having an entry aperture communicating with said primary bore and at least one flow aperture radially disposed in said pilot seat relative to said entry aperture;

a cage body attached to said pilot seat and extending through said primary bore and projecting from said cavity adapter, said cage body having walls defining a secondary bore being generally coaxial with said primary bore and communicating with said inlet port, an outside surface of said cage body being sized and dimensioned relative to an inside surface of said primary bore for defining a radial passage therebetween, said radial passage communicating with said flow aperture and said outlet port;

a spool operatively retained in said secondary bore in said cage body between said pilot seat and a distal end of said cage body, said spool being axially displaceable through said secondary bore, said spool having a sampling orifice therein communicating with said inlet port and said entry aperture of said pilot seat;

biasing means positioned in said secondary bore between said spool and said pilot seat for resisting displacement of said spool through said secondary bore towards said pilot seat, a sampling orifice in a face of said spool communicating with said inlet port and said entry aperture;

an adjustment screw operatively retained in said cavity adapter, said adjusting screw, said pilot seat and said cavity adapter defining a flow chamber, said flow chamber communicating with said entry aperture and said flow aperture;

a biasing plug positioned in said flow chamber for controllably closing said entry aperture operatively associated with said adjustment screw; and said walls of said cage body having a transverse passage therein communicating with said secondary bore and said outlet port, said spool retained in said secondary bore being biased to block said transverse passage for preventing flow from said secondary bore to said outlet port;

whereby said adjustment screw is operated to reduce the biasing force of said biasing plug on said entry aperture to initiate flow from said inlet port through said sampling orifice and through said entry aperture, flow entering said flow chamber being directed through said flow aperture to said radial passage to said outlet port, further operation of the adjustment screw facilitating axial displacement of said spool through said secondary bore to reveal said transverse passage providing controlled flow from said inlet port to said outlet port.

13. A cartridge valve as recited in claim 12, said spool having a face directed towards said inlet port, an annular recess being formed in said face of said spool surrounding said sampling orifice for directing particulate matter in the flow from said inlet port away from said sampling orifice.

14. A cartridge valve as recited in claim 12, said biasing plug further comprising:

a spring operatively retained in said adjustable screw;

a ball retainer positioned on said spring in close proximity to said entry aperture of said pilot seat, said ball retainer having a face with a recess formed therein; and a sealing sphere positioned in said recess for biased engagement in said entry aperture.

15. A cartridge valve as recited in claim 12, said cartridge valve further comprising a control knob assembly being attached to a recess formed in a portion of said cartridge valve extending from said manifold, said control knob assembly including:

a locking ring retained on said cartridge valve for limiting the movement of said control knob assembly;

a handle for operating said cartridge valve;

a split collet having a first end fixably retained in said handle and a second end extending from said handle said second end having walls defining a mouth and axially aligned openings in said walls, said second end being positioned in said recess formed in said extending portion of said cartridge valve;

a fastener attaching said first end of said split collet to said handle; and a frustoconical bushing retained in said mouth of said second end of said split collet, said bushing being engaged by said fastener and urged inwardly into said mouth for spreading said walls of said second end of said split collet to forcibly engage said recess formed in said extending portion of said cartridge valve.

\* \* \* \* \*